Oct. 16, 1923.       1,471,266
M. L. HUNDEBY
PROTECTIVE CASING FOR TIRES
Filed April 17, 1922
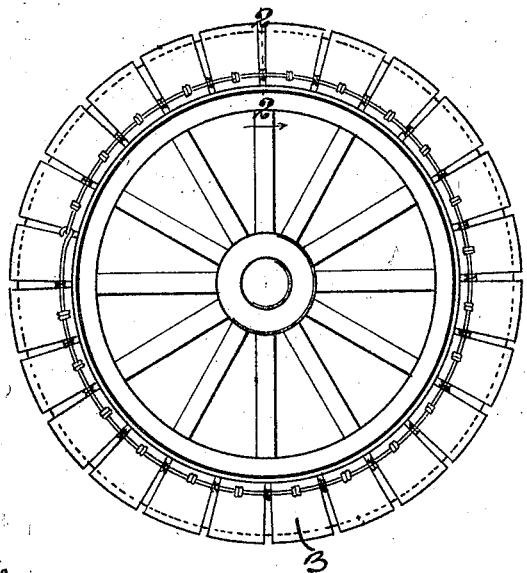
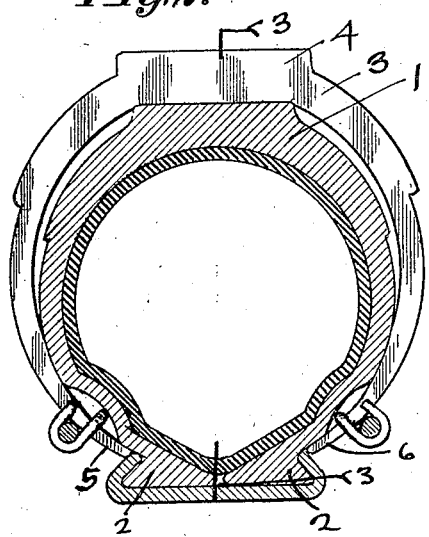
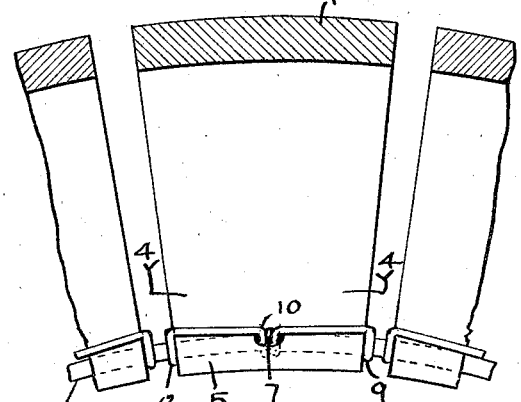
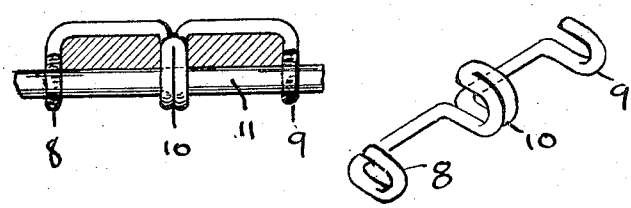
Inventor.
MARTIN L. HUNDEBY
By Lincol Johnson
attorney Patented Oct. 16, 1923.

1,471,266

UNITED STATES PATENT OFFICE.

MARTIN L. HUNDEBY, OF SAN FRANCISCO, CALIFORNIA.

PROTECTIVE CASING FOR TIRES.

Application filed April 17, 1922. Serial No. 553,725.

*To all whom it may concern:*

Be it known that I, MARTIN L. HUNDEBY, a citizen of the United States, and a resident of the city and county of San Francisco, State of California, have made a new and useful invention—to wit, Improvements in Protective Casings for Tires; and I do hereby declare the following to be a full, clear, concise, and exact description of the same.

This invention relates particularly to an improved casing for use on tires.

An object of this invention is to provide an auxiliary protective casing or envelope to be placed around either pneumatic or solid rubber tires for the dual purpose of minimizing the dangers of skidding and to increase the wearing possibilities of a tire, which without the auxiliary structure thereon, would of necessity have to be discarded.

A further object of the invention is to provide an armor of an improved construction that may be cheaply and easily manufactured, readily assembled in operative position on a tire and which will prevent side slip or skidding, eliminate punctures to a great extent and increase the tractive effort.

A still further object of the invention consists in the construction that permits the utilization of old and worn out casings by re-arranging the same according to the method and practice of my invention, thereby permitting the use of the same over tires. Other objects and advantages will appear as this description progresses.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying one sheet of drawings:

Fig. 1 represents a side elevation of a tire and wheel having my invention applied thereto.

Fig. 2 is an enlarged cross section taken through Fig. 1 on the line 2—2.

Fig. 3 is a section taken through Fig. 2 on the line 3—3.

Fig. 4 is a section taken through Fig. 3 on the line 4—4.

Fig. 5 is a perspective of a portion of my invention.

In detail, the construction, illustrated in the drawings, comprises a conventional tire of the pneumatic type, generally designated by the numeral 1, and having the usual beaded edges 2 or other desirable finish for adaptation to the various types of rims now on the market.

The over-tire consists of a plurality of independent sections 3, constructed from rubber or other flexible composition and of fabric or cord, each of which comprises a tread portion 4 and the beaded or attenuated edges 5 and 6 respectively. The over-tire sections are preferably molded or formed in accordance with the standard practice in molding tire casings, so as to provide a substantially hemispherical interior. For the reason that the over-tire sections will be molded in all different shapes and sizes, it is obvious that a snug fit between the interior of the over-tire sections and the exterior of the pneumatic tire must be obtained. As a matter of economy, pneumatic tire casings which have lost their usefulness as an entity may be cut up into sections of a desirable length and the said sections assembled and utilized, in accordance with the practice of my invention, in the same manner that specially molded or constructed sections would be used. Each of the respective tread sections which are to be assembled and utilized as an over-tire are prepared in the following manner.

An opening or hole 7 is perforated through the edge of the respective sections adjacent the edges 5 and 6, and substantially intermediate the ends of the said sections. A metallic clamp member (illustrated in Fig. 5) consisting of a strip of wire has the ends 8 and 9 thereof bended to form laterally projecting hooks, and the intermediate portion 10 thereof, between the ends, similarly bended in the shape of a laterally projecting hook. The space or distance between the projecting hooks 8 and 9 is preferably of a length equal to the beaded edge width of the section 3. Thus, in applying the wire element to the edges of the over-tire section it would be arranged on the interior of the section, so that the projecting hooks 8 and 9 will snugly engage the ends of the tread section and project beyond the exterior face thereof while the middle hook 10 will pass through the opening 7 and project beyond the exterior face of the said over-tire section. Each section 3 is provided with projecting hooks thereon and which are arranged circumferentially around the pneumatic tire casing. An annular split wire ring 11 is adapted to be passed into engagement with each of the projecting hook portions 8, 9 and 10 on each side of the section, so as to join all of said sections and hold the same tightly together. The ends of the annular wire ring 11 would be joined together in any suitable manner, either by means of interlocking hooks 12 or an equivalent thereof. The wire ring 11 would be mounted in engagement with the hooks on each of the opposite sides of the said tread sections to thus bind both sides. Conversely, all of the tread sections may be assembled on the pair of rings 11 prior to arranging the same on the pneumatic casing. In either case, the pneumatic tire would be deflated to permit the over-tire sections being mounted thereover so that by inflating the said casing, with the over-tire sections thereon, the expansion would be sufficient to tightly lock all of the sections on the said inflated casing. By keeping the proper pressure within the pneumatic casing, "creeping" of the over-tire will be eliminated, although under certain circumstances a slight movement is desirable, thus, wearing the exterior of said pneumatic casing evenly at all points. The space between the over-tire sections, likewise, ventilates the frictional points of engagement with the over-tire and casing to eliminate overheating by friction or other troubles.

Having thus described this invention, what I claim and desire to secure by Letters Patent is:

1. An over-tire for a pneumatic tire casing comprising a plurality of independent sections; each having a hole through the opposite edges thereof, between the ends, removable metallic hook members secured on the inside of, and projecting through the hole and around the ends of each of said sections; and an annular ring adapted to be engaged with said hook members for holding all of said sections in assembled relation.

2. An over-tire for a pneumatic tire casing comprising a plurality of independent tread sections; each having a hole through the opposite edges thereof, between the ends, metallic hook members detachably engaged with the edges of said tread sections and adapted to project through the hole and around the ends beyond the exterior of said casing; and a pair of annular ring members adapted to engage the projecting hook members on the opposite sides of said tread sections for holding said tread sections assembled on said pneumatic tire.

3. In combination with a pneumatic tire casing of an over-tire therefor, comprising a plurality of independent tread sections; each having a hole through the opposite edges thereof, between the ends, adapted to pass around the said casing; metallic hook members detachably secured to the opposite edges of each of said tread sections and projecting through the hole and around the ends beyond the exterior thereof; a pair of annular split rings adapted to engage the projecting hooks on the opposite sides of the tread sections at spaced intervals around the periphery of said pneumatic casing; and means for joining the ends of said split rings together.

In testimony whereof, I have hereunto set my hand at San Francisco, California, this 28th day of February, 1922.

MARTIN L. HUNDEBY.

In presence of—
LINCOLN V. JOHNSON.